(12) United States Patent
Zhang

(10) Patent No.: US 11,750,541 B2
(45) Date of Patent: Sep. 5, 2023

(54) METHOD FOR TRANSMITTING LIVE MESSAGE, APPARATUS, ELECTRONIC DEVICE AND MEDIUM

(71) Applicant: BEIJING BAIDU NETCOM SCIENCE AND TECHNOLOGY CO., LTD., Beijing (CN)

(72) Inventor: Chi Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/215,590

(22) Filed: Mar. 29, 2021

(65) Prior Publication Data
US 2021/0218693 A1 Jul. 15, 2021

(30) Foreign Application Priority Data
May 27, 2020 (CN) .......................... 202010463453.3

(51) Int. Cl.
*G06F 15/16* (2006.01)
*H04L 51/04* (2022.01)
*H04L 51/23* (2022.01)
*H04L 51/224* (2022.01)

(52) U.S. Cl.
CPC .............. *H04L 51/04* (2013.01); *H04L 51/23* (2022.05); *H04L 51/224* (2022.05)

(58) Field of Classification Search
CPC ......... H04L 51/24; H04L 51/32; H04L 51/06; H04L 12/1813; H04L 65/00; H04L 51/04; H04L 51/23; H04L 51/224

USPC .................. 709/206, 204, 203, 217, 227
See application file for complete search history.

(56) References Cited

U.S. PATENT DOCUMENTS

| | | | |
|---|---|---|---|
| 6,571,274 B1 * | 5/2003 | Jacobs | G06F 9/546 718/1 |
| 9,554,091 B1 * | 1/2017 | Malegaonkar | H04N 7/152 |
| 2009/0046707 A1 | 2/2009 | Smires et al. | |
| 2010/0330920 A1 * | 12/2010 | Koskela | H04L 1/1825 455/67.11 |
| 2011/0047219 A1 * | 2/2011 | Tripathi | H04L 69/40 709/206 |

(Continued)

FOREIGN PATENT DOCUMENTS

| | | |
|---|---|---|
| CN | 106686393 | 5/2017 |
| CN | 107547947 A * | 1/2018 |

(Continued)

OTHER PUBLICATIONS

European Patent Application No. 21164728.4, Extended European Search Report dated Aug. 10, 2021, 9 pages.

(Continued)

*Primary Examiner* — Kaylee J Huang
(74) *Attorney, Agent, or Firm* — Cozen O'Connor

(57) ABSTRACT

A method, apparatus, electronic device and medium for transmitting a live message are provided. An embodiment of the method executed by a client end may include: detecting periodically a status of a persistent connection with the service end; and in response to detecting that the persistent connection is in a disconnected status, re-establishing the persistent connection with the service end, and pulling a first-type message issued during disconnection of the persistent connection from the service end.

14 Claims, 7 Drawing Sheets

(56) References Cited

U.S. PATENT DOCUMENTS

| | | | |
|---|---|---|---|
| 2011/0202615 A1* | 8/2011 | Fletcher | H04L 65/403 |
| | | | 709/206 |
| 2012/0149348 A1* | 6/2012 | Patel | H04L 65/4061 |
| | | | 455/416 |
| 2013/0111572 A1* | 5/2013 | Gaddam | H04L 67/142 |
| | | | 726/7 |
| 2013/0117413 A1* | 5/2013 | Kaneko | H04N 21/632 |
| | | | 709/217 |
| 2014/0201289 A1* | 7/2014 | Wheeler | H04L 51/00 |
| | | | 709/206 |
| 2015/0142982 A1 | 5/2015 | Gonzales et al. | |
| 2015/0358272 A1* | 12/2015 | Wen | H04L 67/18 |
| | | | 709/206 |
| 2016/0088093 A1 | 3/2016 | Yung et al. | |
| 2016/0148178 A1* | 5/2016 | Yano | G06Q 40/02 |
| | | | 705/42 |
| 2016/0285923 A1 | 9/2016 | Kodaypak | |
| 2018/0098375 A1* | 4/2018 | Iinuma | H04L 61/2038 |
| 2019/0238536 A1* | 8/2019 | Chilla | G06F 21/445 |
| 2019/0306252 A1* | 10/2019 | Lebedev | H04L 12/1827 |
| 2021/0076323 A1* | 3/2021 | Sun | H04W 52/0235 |

FOREIGN PATENT DOCUMENTS

| | | | |
|---|---|---|---|
| CN | 109067910 A | * | 12/2018 |
| CN | 109067910 A | | 12/2018 |
| CN | 109660584 A | | 4/2019 |
| CN | 110278278 A | | 9/2019 |
| CN | 111193769 A | | 5/2020 |
| JP | 2015231116 A | | 12/2015 |
| JP | 2018026763 A | | 2/2018 |
| JP | 2019106695 A | | 6/2019 |
| WO | WO 2016-161716 A1 | | 10/2016 |
| WO | WO-2016197864 A1 | * | 12/2016 |

OTHER PUBLICATIONS

Chinese Patent Application No. 202010463453.3 First Office Action dated Oct. 25, 2021, 10 pages.
Chinese Patent Application No. 202010463453.3 English Translation of First Office Action dated Oct. 25, 2021, 12 pages.
Japanese Patent Application No. 2021-054122 Office Action dated Jul. 19, 2022, 3 pages.
English translation of Japanese Patent Application No. 2021-054122 Office Action dated Jul. 19, 2022, 3 pages.

* cited by examiner

METHOD FOR TRANSMITTING LIVE MESSAGE, APPARATUS, ELECTRONIC DEVICE AND MEDIUM

CROSS-REFERENCE TO RELATED APPLICATIONS

This application claims priority to Chinese Patent Application No. 202010463453.3, filed with the China National Intellectual Property Administration (CNIPA) on May 27, 2020, the content of which is incorporated herein by reference in its entirety.

TECHNICAL FIELD

The present disclosure relate to the field of Internet technology, and particularly to message transmission technology, more particularly to a method for transmitting a live message, an apparatus, an electronic device, and a medium.

BACKGROUND

Live streaming is a method of releasing information on a network having a two-way communication process that simultaneously produces and releases information synchronously along with the occurrence and development of an event on the spot. The forms of live streaming may be classified into live broadcast, studio interview-style live stream, text and picture live stream, video and audio live stream, or live stream with information source provided by Television (third-party). In addition, a live stream has mass storage and convenient query features.

In a client end live stream scenario, data distribution in a live stream room strongly relies on messages pushed through a persistent connection. The messages include: messages such as an update of the number of people online in the live stream room, a common live commenting message, a gift to a host, or a gift money. Messages may also include control commands such as a topic delivery in Q&A live stream, closing a live stream room, global muting, and live streaming switching. If messages in a live stream room cannot reach the client end, or messages reaching the client end are inaccurate, it may seriously affect user experience of a live stream product.

SUMMARY

Embodiments of the present disclosure provide a method for transmitting a live message, an apparatus, an electronic device, and a medium.

In a first aspect, some embodiments of the present disclosure provide method for transmitting a live message, executed by a client end, and a persistent connection being established between the client end and a service end, the method includes: detecting periodically a status of the persistent connection with the service end; and in response to detecting that the persistent connection is in a disconnected status, re-establishing the persistent connection with the service end, and pulling a first-type message issued during disconnection of the persistent connection from the service end.

In a second aspect, some embodiments of the present disclosure provide a method for transmitting a live message, executed by a service end, and a persistent connection being established between the service end and a client end, the method includes: in response to a request for establishing a persistent connection of the client end, re-establishing the persistent connection with the client end, wherein the request for establishing the persistent connection is generated when the client end detects that the persistent connection with the service end is in a disconnected status; and sending a first-type message issued during disconnection of the persistent connection to the client end.

In a third aspect, some embodiments of the present disclosure provide an apparatus for transmitting a live message, configured in an electronic device comprising a client end, and a persistent connection being established between the client end and a service end, the apparatus includes: a detection module, configured to detect periodically a status of the persistent connection with the service end; and a persistent connection establishing module, configured to re-establish the persistent connection with the service end in response to detecting that the persistent connection is in a disconnected status, and pull a first-type message issued during disconnection of the persistent connection from the service end.

In a fourth aspect, some embodiments of the present disclosure provide an apparatus for transmitting a live message, configured in an electronic device comprising a service end, and a persistent connection being established between the service end and a client end, the apparatus includes: a request response module, configured to re-establish the persistent connection with the client end in response to a request for establishing a persistent connection of the client end, wherein the request for establishing the persistent connection is generated when the client end detects that the persistent connection with the service end is in a disconnected status; and a message sending module, configured to send a first-type message issued during disconnection of the persistent connection to the client end.

In a fifth aspect, some embodiments of the present disclosure provide an electronic device for transmitting a live message. The electronic device includes: at least one processor; and a memory, communicatively connected to the at least one processor; where the memory, storing instructions executable by the at least one processor, the instructions, when executed by the at least one processor, cause the at least one processor to perform the method executed by a client end according to any one of embodiments of the first aspect, or cause the at least one processor to perform the method executed by a the service end according to any one of embodiments of the second aspect.

In a sixth aspect, some embodiments of the present disclosure provide a non-transitory computer readable storage medium, storing computer instructions, the computer instructions, when executed by a processor, cause the processor to perform the method executed by a client end according to any one of embodiments of the first aspect, or the method executed by a service end according to any one of embodiments of the second aspect.

In the technical solution of embodiments of the present disclosure, the client end detects periodically the status of the persistent connection with the service end, re-establishes the persistent connection with the service end if it is detected that the persistent connection is in the disconnected status, and pulls the first-type message issued during the disconnection of the persistent connection from the service end. The solution avoids the problem that messages cannot be transmitted regularly during the disconnection of the persistent connection during live stream, resulting in missing messages or inaccurate message transmission, so that the client can accurately acquire messages during live stream.

It should be understood that the content described in this section is not intended to identify key or important features of embodiments of the present disclosure, nor is it intended to limit the scope of the present disclosure. Other features of the present disclosure will be easily understood by the following description.

BRIEF DESCRIPTION OF THE DRAWINGS

The accompanying drawings are used to better understand the present solution and do not constitute a limitation to the present disclosure, in which.

DETAILED DESCRIPTION OF EMBODIMENTS

The following describes example embodiments of the present disclosure with reference to the accompanying drawings, which include various details of embodiments of the present disclosure to facilitate understanding, and should be regarded as merely exemplary. Therefore, those of ordinary skill in the art should realize that various changes and modifications may be made to the embodiments described herein without departing from the scope and spirit of the present disclosure. Likewise, for clarity and conciseness, descriptions of well-known functions and structures are omitted in the following description.

Figure 1:
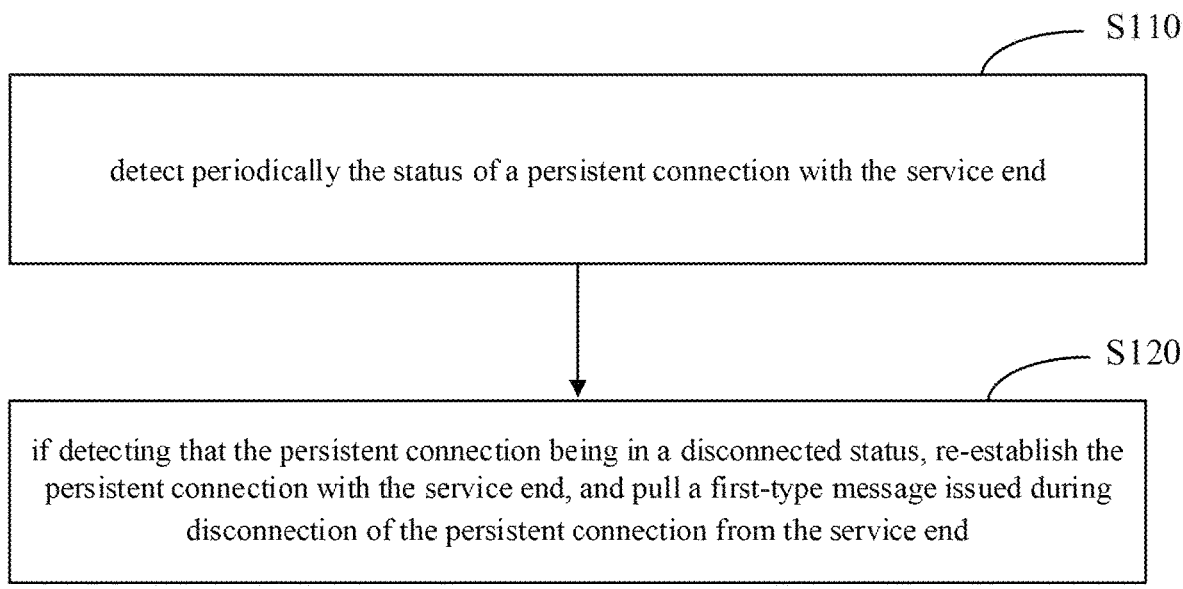
FIG. 1 is a flowchart of a method for transmitting a live message executed by a client end according to an embodiment of the present disclosure.

FIG. 1 is a flowchart of a method for transmitting a live message executed by a client end according to an embodiment of the present disclosure. The present embodiment is applicable to transmitting a message during live stream. Typically, the present embodiment may be applied to the case where the client end periodically detects the status of a persistent connection during live stream, and when detects that the persistent connection is disconnected, pulls a message from a service end in time. Referring to FIG. 1, in the method for transmitting a live message executed by the client end provided by an embodiment of the present disclosure, a persistent connection is established between the client end and the service end, and the method may include:

S110, detecting periodically the status of a persistent connection with the service end.

Here, the persistent connection refers to a communication connection in which a plurality of data packets may be transmitted continuously on one connection, and both parties need to send link test packets if no data packet is transmitted during a period during which the connection is maintained. A persistent connection channel is typically established by the client end with the service end through TCP (Transmission Control Protocol) or UDP (User Datagram Protocol). The service end uses a push mode to push a message to the client end. The persistent connection communication mode has simple service access, extensible messages, and may support scenarios of high concurrency of messages in a live stream room, so the connection may be applied to a live stream scenario.

Since the persistent connection itself in the live stream room is much affected by mobile networks, it is difficult to maintain long-term stability. If the persistent connection disconnects during live stream, it may seriously affect the accurate delivery of messages issued in the live stream room. Therefore, in an embodiment of the present disclosure, the client end may periodically detect the status of the persistent connection with the service end, to learn in time when the persistent connection disconnects, in order to avoid long-term disconnection of the persistent connection affecting a live stream effect. In an embodiment of the present disclosure, since the client end periodically detects the status of the persistent connection, the service end does not need to periodically detect the status of the persistent connection, so that the pressure on the service end may be effectively reduced and the live stream effect may be improved.

S120, if it is detected that the persistent connection is in a disconnected status, re-establishing the persistent connection with the service end, and pulling a first-type message issued during disconnection of the persistent connection from the service end.

The first-type message may be a must-reach message in the live stream room, such as a gift, a gift money, a topic issued in Q&A live stream, closing of the live stream room, switching between live streams. If the must-reach message cannot be delivered accurately, it may affect key data such as a payment result, a settlement result, an answering contest result, or the status of the live room. The above must-reach message is used as the first-type message. Correspondingly, other message in the live stream room except the must-reach message is referred to as common message, such as live stream live commenting, arrival news, or an update of the number of people in the live stream room, which has little impact on a live stream process and event results. The above common message is used as a second-type message.

For example, in order to avoid that long-term disconnection of the persistent connection causing messages during live stream cannot be transmitted to the client end in time and accurately, when the client end detects that the persistent connection disconnects, the client end re-establishes the persistent connection with the service end to ensure that the messages are timely and accurately delivered during the live stream. During the disconnection of the persistent connection, the live stream room may still have messages issued through the service end. Therefore, in order to avoid missing messages, the first-type message issued during the disconnection of the persistent connection needs to be pulled from the service end. The client end may also pull the second-type message issued during the disconnection of the persistent connection from the service end, to maintain the integrity of the messages. The client end may pull the first-type message and/or the second-type message through the persistent connection channel, or may also pull the first-type message and/or the second-type message through a short connection channel, which is not limited herein.

In an embodiment of the present disclosure, the method further includes: receiving a first-type message prompt instruction sent by the service end through the persistent connection; and in response to the first-type message prompt instruction, pulling the first-type message from the service end. The first-type message prompt instruction is generated in response to a fixed event in a live stream room, and the fixed event includes at least one of: a voting, a gift money, or a gift.

Figure 2:
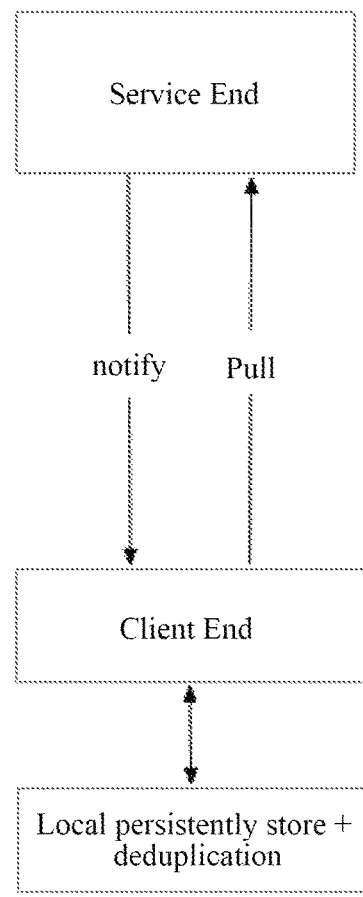
FIG. 2 is a schematic diagram of acquiring a first-type message according to an embodiment of the present disclosure.

As shown in FIG. 2, when a fixed event such as voting, gift money delivery or gift giving is initiated in a live stream room, the service end generates a first-type message prompt instruction in response to the fixed event, to promptly remind the client end that there is a first-type message. The service end may send the first-type message issued in the live stream room to the client end, so that the client end may receive and display the first-type message, or the service end may send the first-type message prompt instruction to the client end instead of directly sending the first-type message to the client end, so that the client end may pull the first-type message from the service end in response to the first-type message prompt instruction. Compared with the solution of the service end sending the first-type message directly to the client end, the service end sending the first-type message prompt instruction to the client end can effectively reduce the amount of data pushed by the service end to the client end, and thus reduce pressure on the service end. In addition, since the amount of transmitted data is reduced, the client end can quickly receive the first-type message prompt instruction, which shortens the time for the message to reach the client end.

In an embodiment of the present disclosure, after the pulling the first-type message from the service end, the method may further include: screening and/or sorting the pulled first-type message based on a first-type message identifier displayed locally, and displaying the pulled first-type message based on a processing result.

For example, in the first-type message pulled by the client end from the service end, there may be some first-type messages that have been displayed locally on the client end. In order to avoid repeated display of the first-type message that has already been displayed, deduplication is performed, and to make the first-type message displayed in order. The pulled first-type message may be screened and/or sorted based on the first-type message identifier displayed locally, and the first-type message in subsequent display may be determined based on the processing result. For example, the first-type message identifier is made monotonously and incrementally increasing, and the displayed first-type message identifiers are 1, 2, 3, 4. A first-type message with the first-type message identifier 3 pulled by the client end from the service end will not be displayed, and a first-type message with the first-type message identifier 5 pulled by the client from the service end will be displayed. Or, it may also be that the client end persistently stores the first-type message that has been displayed locally, and count the number of the first-type message displayed locally. For example, if the number of the first-type message that has been displayed is 20, and the first-type message identifier pulled by the client end from the service end is 19, this first-type message will not displayed, and if the first-type message identifier pulled by the client end from the service end is 21, this first-type message will be displayed. Using the above solution, missing of the first-type message can be avoided, and repeated display of the first-type message can also be avoided, affecting the live stream effect and event processing results. It may also be that the first-type message identifier of the first-type message pulled by the client end from the service end is sorted, so as to display the first-type message in order.

In the above technical solution of this embodiment of the present disclosure, the client end detects periodically the status of the persistent connection with the service end, re-establishes the persistent connection with the service end, and pulls the first-type message issued during the disconnection of the persistent connection from the service end if it is detected that the persistent connection is in the disconnected status. The solution avoids the problem that messages cannot be transmitted regularly during the disconnection of the persistent connection during live stream, resulting in missing messages or inaccurate message transmission, so that the client end can accurately acquire messages during live stream.

Figure 3:
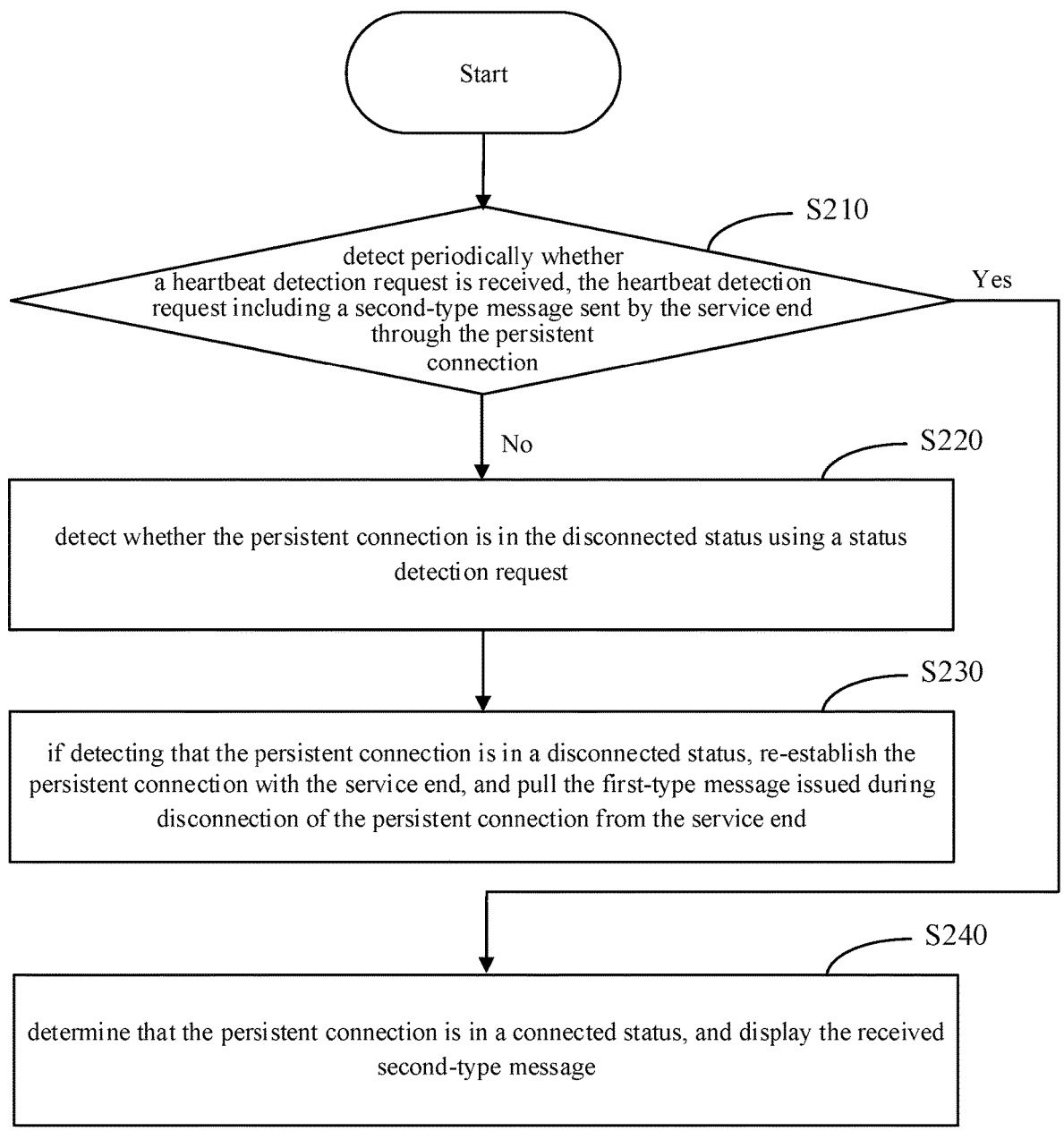
FIG. 3 is a flowchart of a method for transmitting a live message executed by a client end according to another embodiment of the present disclosure.

FIG. 3 is a flowchart of a method for transmitting a live message executed by a client end according to another embodiment of the present disclosure. For details not described in detail in the present embodiment, reference may be made to the above embodiments. Referring to FIG. 3, another method for transmitting a live message executed by a client provided by the present embodiment may include:

S210, detecting periodically whether a heartbeat detection request is received, where the heartbeat detection request includes a second-type message sent by the service end through the persistent connection, if not, performing S220-S230; if yes, performing S240.

Figure 4:
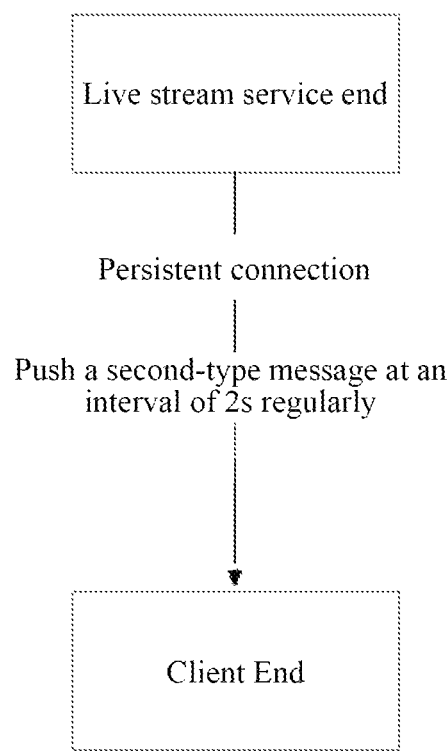
FIG. 4 is a schematic diagram of pushing a second-type message according to an embodiment of the present disclosure.

The explanation to the second-type message is shown in the above embodiments. In order to detect the status of a persistent connection during live stream, the general solution is that the service end periodically detects the status of the persistent connection, and the solution may increase the service end's pressure, which may cause the service end to be unable to process other tasks properly during live stream, affecting the live process. Therefore, in an embodiment of the present disclosure, as shown in FIG. 4, the second-type message delivered periodically to the client end by the service end is used as a downlink heartbeat detection request, and the period may be set as 2s, which is not limited. If the heartbeat detection request including the second-type message sent by the service end through the persistent connection is received, then S240 is performed; and if the heartbeat detection request including the second-type message sent by the service end through the persistent connection is not received, then S220-S230 are performed. By using the second-type message periodically issued by the service end as the downlink heartbeat detection request, the service end only needs to regularly deliver the second-type message issued by the live stream room, and does not need to periodically send additional detection requests to detect the status of the persistent connection, thereby effectively reducing the pressure on the service end, ensuring normal processing of events during live stream by the service end, and maintaining a proper live stream process. The above solution can save resources of the service end. For example, for supporting 5 million people to view live stream online simultaneously, it requires about 62 servers by adopting the above solution, while adopting other live communication solutions it requires about 250 servers.

In an embodiment of the present disclosure, the service end may also divide messages delivered by the live stream room into the first-type message and the second-type message. The client end receives messages sent by the service end through the persistent connection. If the first-type message sent through the persistent connection by the service end is received, the client end performs processing operations on the first-type message, such as pulling the first-type message from the service end, screening and/or sorting, and displaying the pulled first-type message based on a processing result. If the heartbeat detection request including the second-type message sent by the service end through the persistent connection is received, then S240 is performed; and if the heartbeat detection request including the second-type message sent by the service end through the persistent connection is not received, then S220-S230 are performed.

S220, detecting whether the persistent connection is in the disconnected status using a status detection request.

If the client end fails to receive the heartbeat detection request including the second-type message sent by the service end through the persistent connection, it may be that the persistent connection disconnects and thus causes the heartbeat detection request including the second-type message unable to be transmitted to the client end. Therefore, in order to further confirm whether the persistent connection disconnects, the client end may send a status detection request to the service end to detect whether the persistent connection disconnects. For example, after sending the status detection request to the service end, if the client end receives a response message returned by the service end, it may indicate that the persistent connection is connected; and after sending the status detection request to the service end, if the client end does not receive a response message returned by the service end, it may indicate that the persistent connection disconnects. The client end detects whether the persistent connection is in the disconnected status, so that the client end may learn in time when the persistent connection disconnects, to re-establish the persistent connection in time if it is determined that the persistent connection disconnects, ensuring the proper proceeding of the live stream.

S230, in response to detecting that the persistent connection is in a disconnected status, re-establishing the persistent connection with the service end, and pulling the first-type message issued during disconnection of the persistent connection from the service end.

S240, determining that the persistent connection is in a connected status, and displaying the received second-type message.

If the client end receives the heartbeat detection request including the second-type message sent by the service end through the persistent connection, the persistent connection is in the connected status, and the transmission of message can be realized. The client end displays the received second-type message locally to realize normal displaying of the second-type message.

Figure 5:
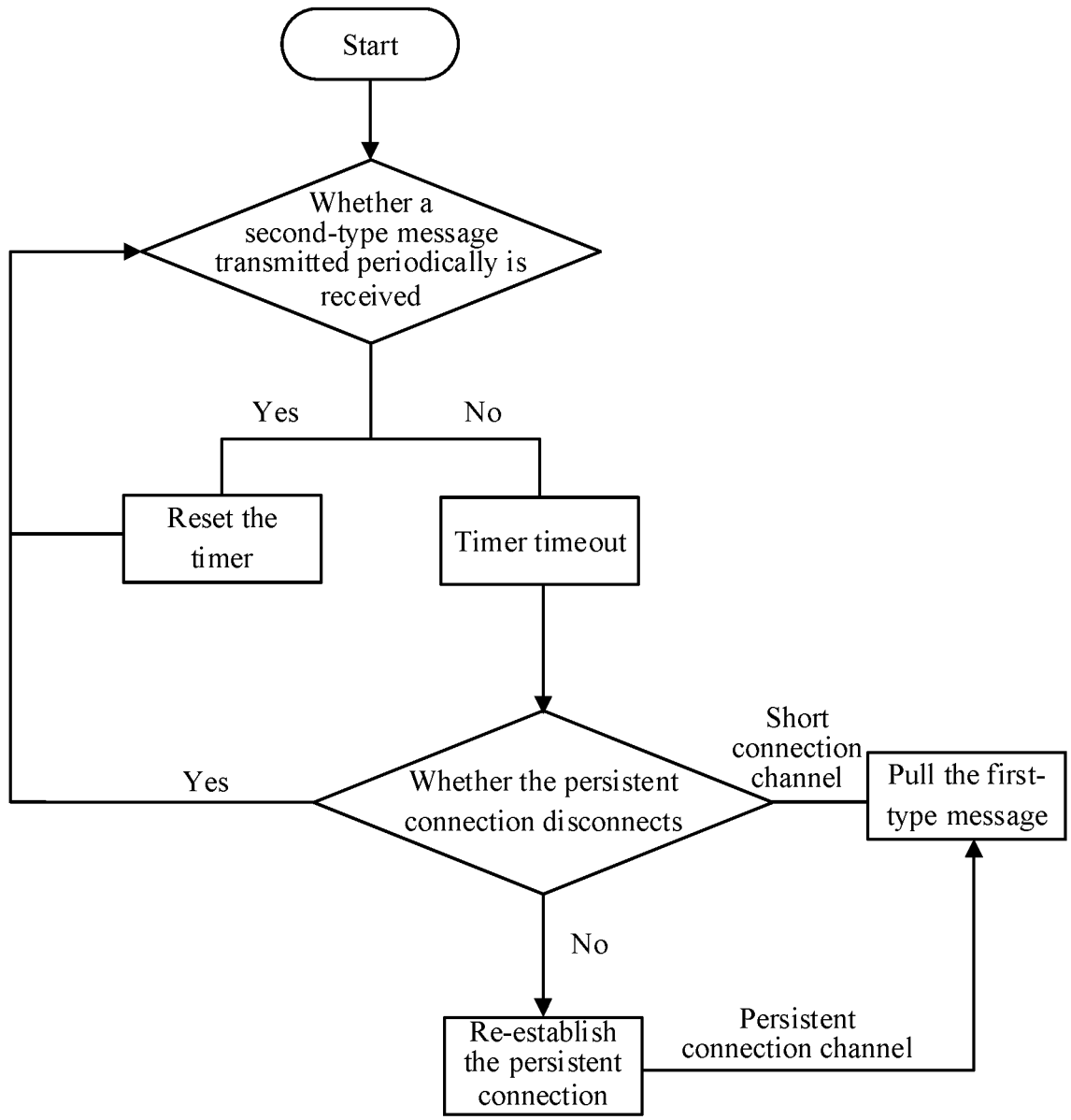
FIG. 5 is a schematic diagram of persistent connection detection and reconstruction and message pulling according to an embodiment of the present disclosure.

In an embodiment of the present embodiment, as shown in FIG. 5, if the message is a second-type message, a timer is reset to continue receiving the second-type message periodically sent by the service end. If the timer is timeout, and the second-type message sent by the service end is not received, it is possible that the second-type message is not successfully transmitted to the client end due to disconnection of the persistent connection. Therefore, S220 is performed again to detect whether the persistent connection is in the disconnected status using the status detection request.

The above technical solution of this embodiment of the present disclosure, detects periodically whether the heartbeat detection request including the second-type message sent by the service end through the persistent connection is received, detects whether the persistent connection is in the disconnected status using the status detection request, if the client end fails to receive the request, so that the client end learns in time when the persistent connection disconnects, and to re-establish the persistent connection in time if it is determined that the persistent connection disconnects, ensuring the proper proceeding of the live stream. In addition, by using the second-type message periodically transmitted by the service end as the downlink heartbeat detection request, the service end only needs to regularly deliver the second-type message issued by the live stream room, and does not need to periodically send additional detection requests to detect the status of the persistent connection, thereby effectively reducing the pressure on the service end, ensuring normal processing of events during live stream by the service end, and maintaining a proper live stream process.

Figure 6:
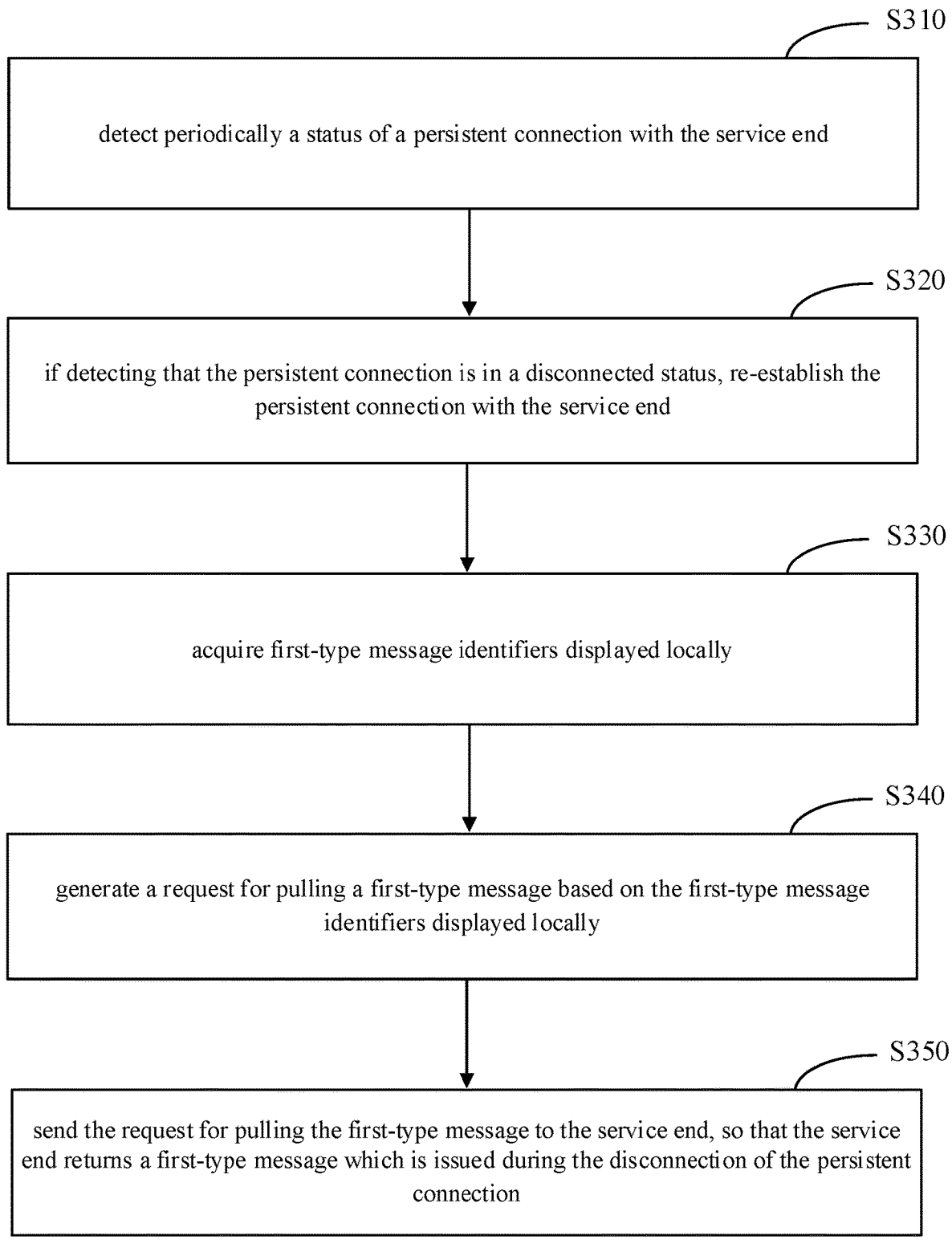
FIG. 6 is a flowchart of a method for transmitting a live message executed by a client end according to an embodiment of the present disclosure.

FIG. 6 is a flowchart of a method for transmitting a live message executed by a client end according to an embodiment of the present disclosure. For details not described in detail in the present embodiment, reference may be made to the above embodiments. Referring to FIG. 6, another method for transmitting a live message executed by a client end provided by the present embodiment may include:

S310, detecting periodically a status of a persistent connection with the service end.

S320, in response to detecting that the persistent connection is in a disconnected status, re-establishing the persistent connection with the service end.

S330, acquiring a first-type message identifier displayed locally.

The first-type message identifier is monotonous and increases incrementally. For example, the first-type message identifier of a first piece of first-type message may be 1, the first-type message identifier of a second piece of first-type message may be 2, and so on. Here, the specific form of the first-type message identifier is not limited, which may also be 01, 02, 03 . . . . Since the first-type message that has been displayed locally on the client end does not need to be displayed again, in order to avoid repeated display of the first-type message, the client end may acquires the first-type message identifier that has been displayed locally, to no longer pull the displayed first-type message from the service end.

S340, generating a request for pulling a first-type message based on the first-type message identifier displayed locally.

S350, sending the request for pulling the first-type message to the service end, so that the service end returns the first-type message issued during the disconnection of the persistent connection.

For example, the client end may generate the request for pulling the first-type message based on all of the first-type message identifiers displayed locally, and send the request for pulling the first-type message to the service end. The service end may compare the first-type message identifier issued by the live stream room with all of the first-type message identifiers that have been already displayed locally, and a first-type message corresponding to an inconsistent first-type message identifier which is obtained from the comparison is a first-type message that has not been displayed by the client end, and the service end returns this first-type message to the client end. For example, all of the first-type message identifiers has been displayed locally on the client end are 1, 2, 3, and 4, and the first-type message identifiers issued by the live stream room in the service end are 1, 2, 3, 4, and 5. The first-type message identifier 5 is inconsistent with all of the first-type message identifiers that have been displayed locally on the client end, and the service end returns the first-type message corresponding to the first-type message identifier 5 to the client end.

In an embodiment of the present embodiment, it may also be that the client end generates the request for pulling a first-type message based on the largest first-type message identifier in the first-type message identifiers which have been displayed locally, and sends the request to the service end. If a first-type message identifier issued by the live stream room in the service end is greater than the largest first-type message identifier, the first-type message corresponding to this first-type message identifier is determined as the first-type message that has not been displayed by the client end, and the service end returns this first-type message to the client end. For example, all of the first-type message identifiers that have displayed locally on the client end are 1, 2, 3, and 4, in which the largest first-type message identifier is 4, and the first-type message identifiers issued by the live stream room in the service end are 1, 2, 3, 4 and 5. The first-type message identifier 5 is greater than the largest first-type message identifier 4, and the service end returns a first-type message corresponding to the first-type message identifier 5 to the client end.

In an embodiment of the present embodiment, it may also be that the client end counts the number of the first-type message that has been displayed locally based on the first-type message identifier that has been displayed locally, generates the request for pulling a first-type message based on the counted number of first-type message that has been displayed and sends the request to the service end. The service end compares a first-type message identifier issued by the live stream room with the number of the first-type message that has been displayed. If the number of first-type message corresponding to the first-type message identifier is greater than the number of the first-type message that has been displayed, then the first-type message corresponding to the first-type message identifier is determined as a first-type message that has not displayed by the client, and the service end returns this first-type message to the client end. For example, all of the first-type message identifiers displayed locally on the client end are 1, 2, 3, and 4, therefore, it can be seen that the number of all of first-type messages that have been displayed locally on the client end is 4. The first-type message identifiers issued by the live stream room in the service end are 1, 2, 3, 4 and 5. The number of first-type message 5 corresponding to the first-type message identifier 5 of the service end is greater than the number of all of the first-type message 4 that have been displayed locally on the client end, then the service end returns a first-type message corresponding to the first-type message identifier 5 to the client end.

In an embodiment of the present disclosure, the first-type message that needs to be pulled from the service end may also be determined based on time of a timer. For example, the client end may request the service end to return the first-type message issued by the live stream room within a timing period of the timer, or the client end may request the service end to return the first-type message issued by the live stream room during the time period from the time the timer is reset to the current time.

In an embodiment of the present embodiment, after the request for pulling the first-type message is sent to the service end, so that the service end returns the first-type message issued during the disconnection of the persistent connection, the method may further include: screening and/or sorting the pulled first-type message based on a first-type message identifier displayed locally, and displaying the pulled first-type message based on a processing result. Therefore, the first-type message is displayed after deduplication, avoiding repeated display of the same first-type message and affecting user experience. By sorting, the first-type message may be played in order to improve user experience.

The above technical solution of the embodiment of the present disclosure, sends the request for pulling a first-type message to the service end, so that the service end returns the first-type message issued during the disconnection of the persistent connection, thereby accurately acquiring the first-type message issued by the live stream room during the persistent connection disconnection, and avoiding missing of the first-type message. By acquiring the first-type message identifier that has been displayed locally, generating the request for pulling a first-type message based on the first-type message identifier that has been displayed locally, a selective pulling of the first-type message is realized, and thus the client end is prevented from repeatedly displaying the same first-type message locally, and user experience of the live stream is improved.

Figure 7:
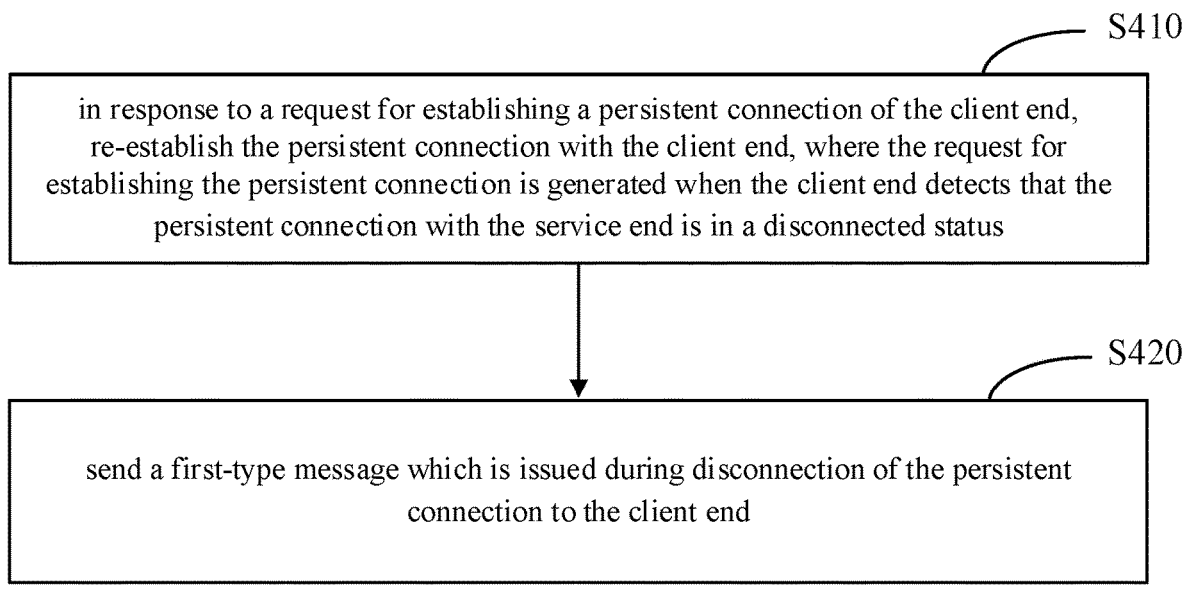
FIG. 7 is a flowchart of a method for transmitting a live message executed by a service end according to an embodiment of the present disclosure.

FIG. 7 is a flowchart of a method for transmitting a live message executed by a service end according to an embodiment of the present disclosure. The present embodiment is applicable to transmitting a message during live stream. Typically, the present embodiment may be applied to the case where a client end periodically detects the status of a persistent connection during live stream, and pulls a message from a service end in time when a persistent connection is detected to be disconnected. For details not described in detail in this embodiment of the present disclosure, reference may be made to the above embodiments. Referring to FIG. 7, in the method for transmitting a live message executed by a service end provided by an embodiment of the present disclosure, a persistent connection is established between the client end and the service end, and the method may include:

S410, in response to a request for establishing a persistent connection of the client end, re-establishing the persistent connection with the client end, wherein the request for establishing the persistent connection is generated when the client end detects that the persistent connection with the service end is in a disconnected status.

Here, the persistent connection refers to a communication connection in which a plurality of data packets may be transmitted continuously on one connection, and both parties need to send link test packets if no data packet is transmitted during a period during which the connection is maintained. A persistent connection channel is typically established by the client end with the service end through TCP (Transmission Control Protocol) or UDP (User Datagram Protocol). The service end uses a push mode to push a message to the client end. The persistent connection communication has simple service access, extensible messages, and may support scenarios of high concurrency of messages in a live stream room, so the connection may be applied to a live stream scenario.

Since the persistent connection itself in the live stream room is much affected by mobile networks, it is difficult to maintain long-term stability. If the persistent connection disconnects during live stream, it may seriously affect the accurate delivery of messages issued in the live stream room. Therefore, in an embodiment of the present disclosure, the client end may periodically detect the status of the persistent connection with the service end, to learn in time when the persistent connection disconnects, in order to avoid long-term disconnection of the persistent connection affecting a live stream effect. In an embodiment of the present disclosure, since the client end periodically detects the status of the persistent connection, the service end does not need to periodically detect the status of the persistent connection, so that the pressure on the service end may be effectively reduced and the live stream effect may be improved.

In order to avoid that long-term disconnection of the persistent connection causing messages issued during live stream cannot be sent to the client in time and accurately, the client re-establishes the persistent connection with the service end when the client end detects that the persistent connection disconnects, to ensure that the messages are timely and accurately delivered during the live stream. The service end re-establishes the persistent connection with the client end in response to a request for establishing the persistent connection of the client end.

S420, sending a first-type message issued during disconnection of the persistent connection to the client end.

The first-type message may be a must-reach message in the live stream room, such as a gift, a gift money, a topic issued in Q&A live stream, closing of the live stream room, switching between live streams. If the must-reach message cannot be delivered accurately, it may affect key data such as a payment result, a settlement result, an answering contest result, or the stats of the live stream room. The above must-reach message is used as the first-type message. Correspondingly, common message in the live stream room such as live stream live commenting, arrival news, or an update of the number of people in the live stream room, has little impact on a live stream process and event results. The above common message is used as a second-type message.

During the disconnection of the persistent connection, the live stream room may still have messages issued through the service end. Therefore, in order to avoid messages missing, the service end sends the first-type message issued during the disconnection of the persistent connection to the client end. The second-type message may also be sent to the client end to maintain the integrity of the messages.

In an embodiment of the present embodiment, the sending a first-type message issued during disconnection of the persistent connection to the client end, includes: in response to a request for pulling the first-type message generated by the client end based on a displayed first-type message identifier, sending the first-type message issued during the disconnection of the persistent connection to the client end. The first-type message identifier is monotonous and increases incrementally.

For example, when the client end detects that the persistent connection is in the disconnected status, the client end acquires a first-type message identifier that has been displayed locally, generates a request for puling a first-type message based on the first-type message identifier that has been displayed locally, and sends the request for pulling a first-type message to the service end, so that the service end returns a first-type message in response to the request for pulling a first-type message sent by the client end. For details, reference may be made to S330-S350 in the above embodiment.

In an embodiment of the present embodiment, the method further includes: sending a heartbeat detection request including a second-type message to the client end periodically through the persistent connection, so that the client end detects whether the persistent connection is in the disconnected status using a status detection request when the heartbeat detection request is not received.

The explanation to the second-type message is shown in the above embodiments. In order to detect the status of a persistent connection during live stream, the general solution is that the service end periodically detects the status of the persistent connection, and the solution may increase the service end's pressure, which may cause the service end to be unable to process other tasks properly during live stream, affecting the live process. Therefore, in an embodiment of the present disclosure, the second-type message delivered periodically to the client end by the service end is used as a downlink heartbeat detection request. The client end receives the message sent by the service end through the persistent connection, and if the heartbeat detection request including the second-type message sent by the service end through the persistent connection is received, it is determined that the persistent connection is in the connected status, and the received second-type message will be displayed; and if the heartbeat detection request including the second-type message sent by the service end through the persistent connection is not received, the client end detects whether the persistent connection is in the disconnected status using the status detection request. By using the second-type message periodically delivered by the service end as the downlink heartbeat detection request, the service end only needs to regularly send the second-type message issued by the live stream room, and does not need to periodically send additional detection requests to detect the status of the persistent connection, thereby effectively reducing the pressure on the service end, ensuring normal processing of events during live stream by the service end, and maintaining a proper live stream process.

In an embodiment of the present disclosure, the service end may also classify messages issued by the live stream room into the first-type message and the second-type message. The client end receives messages sent by the service end through the persistent connection. If the first-type message sent through the persistent connection by the service end is received, the client end performs processing operations on the first-type message, such as pulling the first-type message from the service end, screening and/or sorting, and displaying the pulled first-type message based on a processing result. If the heartbeat detection request including the second-type message sent by the service end through the persistent connection is received, it is determined that the persistent connection is in the connected status, and the received second-type message will be displayed; and if the heartbeat detection request including the second-type message sent by the service end through the persistent connection is not received, the client detects whether the persistent connection is in the disconnected status using a status detection request.

In an embodiment of the present embodiment, the method further includes: sending a first-type message prompt instruction to the client end through the persistent connection, so that the client end pulls the first-type message from the service end in response to the first-type message prompt instruction. The first-type message prompt instruction is generated in response to a fixed event in a live stream room, and the fixed event includes at least one of: a voting, a gift money, or a gift.

When a fixed event such as voting, gift money delivery or gift giving is initiated in a live stream room, the service end generates a first-type message prompt instruction to promptly remind the client end that there is a first-type message. The service end may send the first-type message issued in the live stream room to the client end, so that the client end may receive and display the first-type message, or the service end may send the first-type message prompt instruction to the client end instead of directly sending the first-type message to the client end, so that the client end may pull the first-type message from the service end in response to the first-type message prompt instruction. Compared with the solution of the service end sending the first-type message directly to the client end, the service end sending the first-type message prompt instruction to the client end can effectively reduce the amount of data pushed by the service end to the client end, and thus reduce pressure on the service end. In addition, since the amount of transmitted data is reduced, the client end can quickly receive the first-type message prompt instruction, which shortens the time for the message to reach the client end.

The above technical solution of the embodiment of the present disclosure, by re-establishing the persistent connection with the client end in response to a request for establishing a persistent connection from the client end, and sending the first-type message issued during the disconnection of the persistent connection to the client end, avoids the problem that messages cannot be transmitted regularly during the disconnection of the persistent connection during live stream, resulting in messages missing or inaccurate message transmission, so that the client end can accurately acquire messages during live stream.

Figure 8:
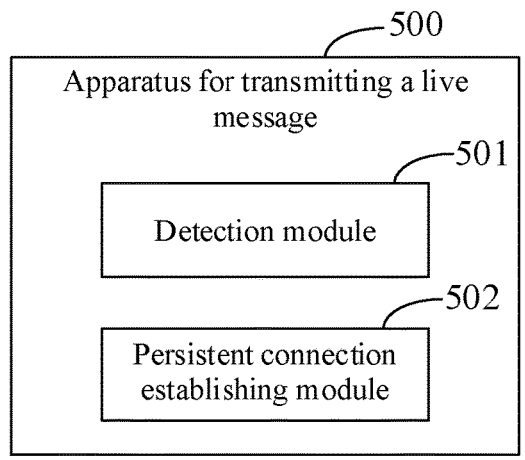
FIG. 8 is a schematic structural diagram of an apparatus for transmitting a live message configured in an electronic device of a client end according to an embodiment of the present disclosure.

FIG. 8 is a schematic structural diagram of an apparatus for transmitting a live message configured in an electronic device of a client end according to an embodiment of the present disclosure. Referring to FIG. 8, in the apparatus 500 for transmitting a live message configured in an electronic device of a client end according to an embodiment of the present disclosure, a persistent connection is established between the client end and a service end, and the apparatus includes: a detection module 501 and a persistent connection establishing module 502.

The detection module 501 is configured to detect periodically a status of the persistent connection with the service end.

The persistent connection establishing module 502 is configured to re-establish the persistent connection with the service end in response to detecting that the persistent connection is in a disconnected status, and pull a first-type message issued during disconnection of the persistent connection from the service end.

In an embodiment of the present disclosure, the persistent connection establishing module 502 includes:

an identifier acquisition unit, configured to acquire a first-type message identifier displayed locally;

a request generation unit, configured to generate a request for pulling a first-type message based on the first-type message identifier displayed locally; and a request sending unit, configured to send the request for pulling the first-type message to the service end, so that the service end returns the first-type message issued during the disconnection of the persistent connection.

In an embodiment of the present disclosure, the first-type message identifier is monotonous and increases incrementally.

In an embodiment of the present disclosure, the detection module 501 includes:

a request detection unit, configured to detect periodically whether a heartbeat detection request is received, where the heartbeat detection request comprises a second-type message sent by the service end through the persistent connection; and a status detection unit, configured to, if the heartbeat detection request is not received, detect whether the persistent connection is in the disconnected status using a status detection request.

In an embodiment of the present disclosure, the apparatus further includes:

a message displaying module, configured to, after detect periodically whether a heartbeat detection request including a second-type message sent by the service end through the persistent connection is received, if the heartbeat detection request is received, determine that the persistent connection is in a connected status, and display the received second-type message.

In an embodiment of the present disclosure, the apparatus further includes:

a prompt instruction receiving module, configured to receive a first-type message prompt instruction sent by the service end through the persistent connection; and a prompt instruction responding module, configured to pull the first-type message from the service end in response to the first-type message prompt instruction.

In an embodiment of the present disclosure, the apparatus further includes:

a processing module, configured to screen and/or sort the pulled first-type message based on a first-type message identifier displayed locally, and display the pulled first-type message based on a processing result.

In an embodiment of the present disclosure, the first-type message prompt instruction is generated in response to a fixed event in a live stream room, and the fixed event includes at least one of: a voting, a gift money, or a gift.

The apparatus for transmitting a live message configured in an electronic device of a client end according to an embodiment of the present disclosure may perform the method for transmitting a live message executed by a client end provided in any embodiment of the present disclosure, and has corresponding functional modules and beneficial effects for performing the method.

Figure 9:
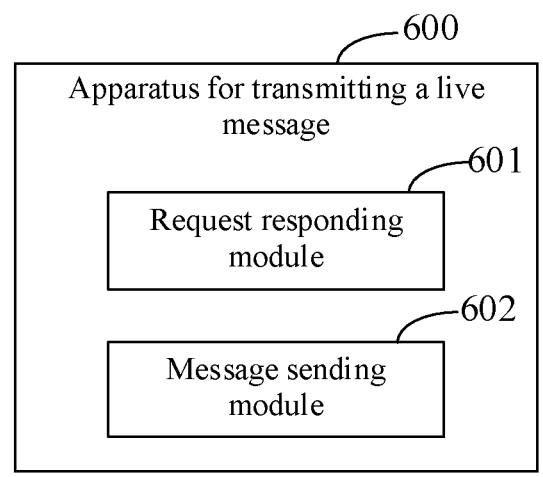
FIG. 9 is a schematic structural diagram of an apparatus for transmitting a live message configured in an electronic device of a service end according to an embodiment of the present disclosure.

FIG. 9 is a schematic structural diagram of an apparatus for transmitting a live message configured in an electronic device of a service end according to an embodiment of the present disclosure. Referring to FIG. 9, in the apparatus 600 for transmitting a live message configured in an electronic device of a service end according to an embodiment of the present disclosure, a persistent connection is established between the service end and a client end, and the apparatus includes: a request responding module 601 and a message sending module 602.

The request responding module 601 is configured to, in response to a request for establishing a persistent connection of the client end, re-establish the persistent connection with the client end, where the request for establishing the persistent connection is generated when the client end detects that the persistent connection with the service end is in a disconnected status.

The message sending module 602 is configured to send a first-type message issued during disconnection of the persistent connection to the client end.

In an embodiment of the present disclosure, the message sending module 602 is configured to:

in response to a request for pulling the first-type message generated by the client end based on a displayed first-type message identifier, send the first-type message issued during the disconnection of the persistent connection to the client end.

In an embodiment of the present disclosure, the first-type message identifier is monotonous and increases incrementally.

In an embodiment of the present disclosure, the apparatus further includes:

a heartbeat detection request sending module, configured to send a heartbeat detection request including a second-type message to the client end periodically through the persistent connection, so that the client end detects whether the persistent connection is in the disconnected status using a status detection request when the heartbeat detection request is not received.

In an embodiment of the present disclosure, the apparatus further includes:

a prompt instruction sending module, configured to send a first-type message prompt instruction to the client end through the persistent connection, so that in response to the first-type message prompt instruction, the client end pulls the first-type message from the service end.

In an embodiment of the present disclosure, the first-type message prompt instruction is generated in response to a fixed event in a live stream room, and the fixed event includes at least one of: a voting, a gift money, or a gift.

The apparatus for transmitting a live message configured in an electronic device of a service end according to an embodiment of the present disclosure may perform the method for transmitting a live message executed by a service end provided in any embodiment of the present disclosure, and has corresponding functional modules and beneficial effects for performing the method.

According to an embodiment of the present disclosure, an electronic device and a readable storage medium are provided.

Figure 10:
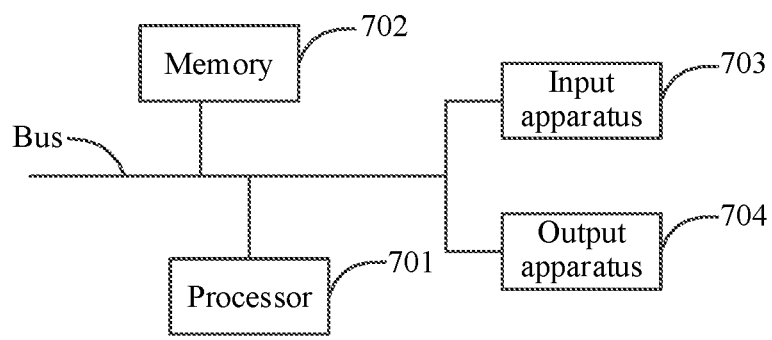
FIG. 10 is a block diagram of an electronic device used to implement the method for transmitting a live message according to an embodiment of the present disclosure.

As shown in FIG. 10, is a block diagram of an electronic device of the method for transmitting a live message according to an embodiment of the present disclosure. When the electronic device implements the method for transmitting a live message executed by a client end, the electronic device may be a terminal device, such as a mobile phone, a tablet computer, or a wearable device. When the electronic device implements the method for transmitting a live message executed by a service end, the electronic device may be a service end or the like. The electronic device is intended to represent various forms of digital computers, such as laptop computers, desktop computers, workbenches, personal digital assistants, service ends, blade service ends, mainframe computers, and other suitable computers. The electronic device may also represent various forms of mobile apparatuses, such as personal digital processors, cellular phones, smart phones, wearable devices, and other similar computing apparatuses. The components shown herein, their connections and relationships, and their functions are merely examples, and are not intended to limit the implementation of the present disclosure described and/or claimed herein.

As shown in FIG. 10, the electronic device includes: one or more processors 701, a memory 702, and interfaces for connecting various components, including high-speed interfaces and low-speed interfaces. The various components are connected to each other using different buses, and may be installed on a common motherboard or in other methods as needed. The processor may process instructions executed within the electronic device, including instructions stored in or on the memory to display graphic information of GUI on an external input/output apparatus (such as a display device coupled to the interface). In other embodiments, a plurality of processors and/or a plurality of buses may be used together with a plurality of memories and a plurality of memories if desired. Similarly, a plurality of electronic devices may be connected, and the devices provide some necessary operations, for example, as a service end array, a set of blade service ends, or a multi-processor system. In FIG. 10, one processor 701 is used as an example.

The memory 702 is a non-transitory computer readable storage medium provided by the present disclosure. The memory stores instructions executable by at least one processor, so that the at least one processor performs the method for transmitting a live message executed by a client end provided by an embodiment of the present disclosure, or the method for transmitting a live message executed by a service end provided by an embodiment of the present disclosure. The non-transitory computer readable storage medium of the present disclosure stores computer instructions for causing a computer to perform the method for transmitting a live message executed by a client end provided by an embodiment of the present disclosure, or the method for transmitting a live message executed by a service end provided by an embodiment of the present disclosure.

The memory 702, as a non-transitory computer readable storage medium, may be used to store non-transitory software programs, non-transitory computer executable programs and modules, such as program instructions/modules corresponding to the method for transmitting a live message in embodiments of the present disclosure (for example, the detection module 501 and the persistent connection establishing module 502 as shown in FIG. 8, or the request responding module 601 and the message sending module 602 as shown in FIG. 9). The processor 701 executes the non-transitory software programs, instructions, and modules stored in the memory 702 to execute various functional applications and data processing of the service end, that is, to implement the method for transmitting a live message executed by a client, or the method for transmitting a live message executed by a service end in the foregoing method embodiments.

The memory 702 may include a storage program area and a storage data area, where the storage program area may store an operating system and at least one function required application program; and the storage data area may store data created by the use of the electronic device according to the method for processing parking, etc. In addition, the memory 702 may include a high-speed random access memory, and may also include a non-transitory memory, such as at least one magnetic disk storage device, a flash memory device, or other non-transitory solid-state storage devices. In some embodiments, the memory 702 may optionally include memories remotely provided with respect to the processor 701, and these remote memories may be connected to the electronic device of the method for processing parking through a network. Examples of the above network include but are not limited to the Internet, intranet, local area network, mobile communication network, and combinations thereof.

The electronic device of the method for transmitting a live message may further include: an input apparatus 703 and an output apparatus 704. The processor 701, the memory 702, the input apparatus 703, and the output apparatus 704 may be connected through a bus or in other methods. In FIG. 10, connection through a bus is used as an example.

The input apparatus 703 may receive input digital or character information, and generate key signal inputs related to user settings and function control of the electronic device of the method for processing parking, such as touch screen, keypad, mouse, trackpad, touchpad, pointing stick, one or more mouse buttons, trackball, joystick and other input apparatuses. The output apparatus 604 may include a display device, an auxiliary lighting apparatus (for example, LED), a tactile feedback apparatus (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, dedicated ASICs (application specific integrated circuits), computer hardware, firmware, software, and/or combinations thereof. These various embodiments may include: being implemented in one or more computer programs that can be executed and/or interpreted on a programmable system that includes at least one programmable processor. The programmable processor may be a dedicated or general-purpose programmable processor, and may receive data and instructions from a storage system, at least one input apparatus, and at least one output apparatus, and transmit the data and instructions to the storage system, the at least one input apparatus, and the at least one output apparatus.

These computing programs (also referred to as programs, software, software applications, or codes) include machine instructions of the programmable processor and may use high-level processes and/or object-oriented programming languages, and/or assembly/machine languages to implement these computing programs. As used herein, the terms "machine readable medium" and "computer readable medium" refer to any computer program product, device, and/or apparatus (for example, magnetic disk, optical disk, memory, programmable logic apparatus (PLD)) used to provide machine instructions and/or data to the programmable processor, including machine readable medium that receives machine instructions as machine readable signals. The term "machine readable signal" refers to any signal used to provide machine instructions and/or data to the programmable processor.

In order to provide interaction with a user, the systems and technologies described herein may be implemented on a computer, the computer has: a display apparatus for displaying information to the user (for example, CRT (cathode ray tube) or LCD (liquid crystal display) monitor); and a keyboard and a pointing apparatus (for example, mouse or trackball), and the user may use the keyboard and the pointing apparatus to provide input to the computer. Other types of apparatuses may also be used to provide interaction with the user; for example, feedback provided to the user may be any form of sensory feedback (for example, visual feedback, auditory feedback, or tactile feedback); and any form (including acoustic input, voice input, or tactile input) may be used to receive input from the user.

The systems and technologies described herein may be implemented in a computing system that includes backend components (e.g., as a data server), or a computing system that includes middleware components (e.g., application server), or a computing system that includes frontend components (for example, a user computer having a graphical user interface or a web browser, through which the user may interact with the implementations of the systems and the technologies described herein), or a computing system that includes any combination of such backend components, middleware components, or frontend components. The components of the system may be interconnected by any form or medium of digital data communication (e.g., communication network). Examples of the communication network include: local area networks (LAN), wide area networks (WAN), and the Internet.

The computer system may include a client end and a service end. The client end and the service end are generally far from each other and usually interact through the communication network. The relationship between the client end and the service end is generated by computer programs that run on the corresponding computer and have a client end-service end relationship with each other.

The technical solution of embodiments of the present disclosure, avoids the problem that messages cannot be transmitted regularly during the disconnection of the persistent connection during live stream, resulting in messages missing or inaccurate message transmission, so that messages during live stream can be accurately acquired.

It should be understood that the various forms of processes shown above may be used to reorder, add, or delete steps. For example, the steps described in embodiments of the present disclosure may be performed in parallel, sequentially, or in different orders. As long as the desired results of the technical solution disclosed in embodiments of the present disclosure can be achieved, no limitation is made herein.

The above specific embodiments do not constitute limitation on the protection scope of the present disclosure. Those skilled in the art should understand that various modifications, combinations, sub-combinations and substitutions may be made according to design requirements and other factors. Any modification, equivalent replacement and improvement made within the spirit and principle of the present disclosure shall be included in the protection scope of the present disclosure.

What is claimed is:

1. A method for transmitting a live message, executed by a client end, and a persistent connection being established between the client end and a service end, the method comprising:

detecting periodically whether a second-type message sent by the service end through the persistent connection is received;

determining that the second-type message is not received for a period;

detecting a status of the persistent connection with the service end, in response to determining that the second-type message is not received for the period; and in response to detecting that the persistent connection is in a disconnected status, re-establishing the persistent connection with the service end, and pulling a first-type message issued during disconnection of the persistent connection from the service end, wherein the pulling the first-type message during the disconnection of the persistent connection from the service end, comprises:

generating a request for pulling the first-type message, wherein the request for pulling the first-type message comprises a counted number of first-type messages that have been displayed at the client end; and sending the request for pulling the first-type message to the service end, so that the service end returns the first-type message issued during the disconnection of the persistent connection, wherein the counted number of the first-type messages is compared with a first-type message identifier issued by a live stream room, and a first-type message corresponding to the first-type message identifier greater than the counted number and issued by the live stream room is determined as the first-type message returned by the service end.

2. The method according to claim 1, wherein the first-type message identifier is monotonous and increases incrementally.

3. The method according to claim 1, wherein after the pulling the first-type message from the service end, the method further comprises:
screening and/or sorting the pulled first-type message based on a first-type message identifier displayed locally, and displaying the pulled first-type message based on a processing result.

4. The method according to claim 1, wherein the method comprises:
receiving a first-type message prompt instruction sent by the service end through the persistent connection, wherein the first-type message prompt instruction is generated by the service end in response to a fixed event in the live stream room, for reminding the client end that there is a target first-type message; and
in response to the first-type message prompt instruction, pulling the target first-type message from the service end, wherein the fixed event comprises at least one of: a voting, a gift money, or a gift.

5. The method according to claim 1, wherein a timer is configured to receive the second-type message periodically, and detecting the status of the persistent connection with the service end, in response to determining that the second-type message is not received for the period comprises: detecting the status of the persistent connection with the service end, in response to determining that the timer is timeout and the second-type message is not received.

6. The method according to claim 1, wherein the persistent connection is a communication connection, and a plurality of data packets is transmitted continuously on the persistent connection.

7. The method according to claim 1, wherein the second-type message is delivered by the live stream room and comprises at least one of live commenting, arrival news, or an update of a number of people in the live stream room.

8. A non-transitory computer readable storage medium, storing computer instructions, the computer instructions, when executed by a processor, cause the processor to perform the method executed by a client end according to claim 1.

9. A method for transmitting a live message, executed by a service end, and a persistent connection being established between the service end and a client end, the method comprising:
sending periodically a second-type message through the persistent connection;
in response to a request for establishing the persistent connection of the client end, re- establishing the persistent connection with the client end, wherein the request for establishing the persistent connection is generated when the client end detects that the persistent connection with the service end is in a disconnected status, wherein a status of the persistent connection with the service end is detected by the client end, in response to determining that the second-type message is not received; and
sending a first-type message issued during disconnection of the persistent connection to the client end, wherein the sending the first-type message issued during disconnection of the persistent connection to the client end, comprises:

in response to a request for pulling the first-type message generated by the client end based on a displayed first-type message identifier, sending the first-type message issued during the disconnection of the persistent connection to the client end, wherein the request for pulling the first-type message comprises a counted number of first-type messages that have been displayed at the client end, the counted number of the first-type messages is compared with a first-type message identifier issued by a live stream room, and a first-type message corresponding to the first-type message identifier greater than the counted number and issued by the live stream room is determined as the first-type message returned by the service end.

10. The method according to claim 9, wherein the first-type message identifier is monotonous and increases incrementally.

11. The method according to claim 9, wherein the method comprises:
sending a first-type message prompt instruction to the client end through the persistent connection, so that in response to the first-type message prompt instruction, the client end pulls a target first-type message from the service end,
wherein the first-type message prompt instruction is generated by the service end in response to a fixed event in the live stream room, for reminding the client end that there is the first-type message,
wherein the fixed event comprises at least one of: a voting, a gift money, or a gift.

12. An electronic device for transmitting a live message, comprising:
at least one processor; and
a memory, communicatively connected to the at least one processor; wherein, the memory, storing instructions executable by the at least one processor, the instructions, when executed by the at least one processor, cause the at least one processor to perform the method executed by a service end according to claim 9.

13. A non-transitory computer readable storage medium, storing computer instructions, the computer instructions, when executed by a processor, cause the processor to perform the method executed by a service end according to claim 9.

14. An electronic device for transmitting a live message, comprising:
at least one processor; and
a memory, communicatively connected to the at least one processor; wherein, the memory, storing instructions executable by the at least one processor, the instructions, when executed by the at least one processor, cause the at least one processor to perform operations executed by a client end, the operations comprising:
detecting periodically whether a second-type message sent by the service end through the persistent connection is received, the persistent connection being established between the client end and the service end;
determining that the second-type message is not received for a period;
detecting a status of the persistent connection with the service end, in response to determining that the second-type message is not received for the period; and
in response to detecting that the persistent connection is in a disconnected status, re-establishing the persistent connection with the service end, and pulling a first-type message issued during disconnection of the persistent connection from the service end, wherein the pulling the first-type message during the disconnection of the persistent connection from the service end, comprises:

generating a request for pulling the first-type message, wherein the request for pulling the first-type message comprises a counted number of first-type messages that have been displayed at the client end; and sending the request for pulling the first-type message to the service end, so that the service end returns the first-type message issued during the disconnection of the persistent connection, wherein the counted number of the first-type messages is compared with a first-type message identifier issued by a live stream room, and a first-type message corresponding to the first-type message identifier greater than the counted number and issued by the live stream room is determined as the first-type message returned by the service end.

* * * * *